United States Patent [19]
Pienta

[11] Patent Number: 5,713,254
[45] Date of Patent: *Feb. 3, 1998

[54] CORE CUTTING MACHINE

[75] Inventor: David J. Pienta, Lambertville, Mich.

[73] Assignee: Automatic Handling, Inc., Erie, Mich.

[*] Notice: The term of this patent shall not extend beyond the expiration date of Pat. No. 5,555,783.

[21] Appl. No.: 654,728

[22] Filed: May 29, 1996

Related U.S. Application Data

[62] Division of Ser. No. 358,800, Dec. 19, 1994, Pat. No. 5,555,783.

[51] Int. Cl.$^6$ .............................. B23B 5/14; B23D 21/00
[52] U.S. Cl. .................................... 82/96; 82/101
[58] Field of Search ...................... 82/89, 92, 96, 82/97, 101, 102, 168, 169, 129; 242/578, 594.2, 611, 611.1, 607, 608.1; 83/54

[56] References Cited

U.S. PATENT DOCUMENTS

| | | |
|---|---|---|
| 3,143,014 | 8/1964 | Blake .......................... 82/101 |
| 3,190,158 | 6/1965 | Snyderman ................... 82/101 |
| 3,911,768 | 10/1975 | Kawano ........................ 82/91 |
| 4,693,149 | 9/1987 | Sireix ............................ 82/101 |

OTHER PUBLICATIONS

Automatic Handling, "Introducing Core utters That Cut More Than Cores!", Oct. 1994.

*Primary Examiner*—Andrea L. Pitts
*Assistant Examiner*—Henry W. H. Tsai
*Attorney, Agent, or Firm*—Emch, Schaffer, Schaub & Porcello Co.

[57] ABSTRACT

A core cutter machine for cutting cylindrical cores of predetermined widths is disclosed. The core cutting machine has a plurality of mandrels of predetermined diameters. Each of the mandrels receives a core tube to be cut. A cutter or knife assembly is mounted adjacent each of the mandrels and a support assembly is positioned adjacent each of the mandrels in opposed relationship to the cutter assembly.

3 Claims, 5 Drawing Sheets

CORE CUTTING MACHINE

This application is a division of application 08/358,800 filed Dec. 19, 1994, now U.S. Pat. No. 5,555,783, issued on Sep. 17, 1996.

DESCRIPTION

BACKGROUND OF THE INVENTION

The present invention is directed to a core cutting machine. Core cutting machines are well known in the art. Such machines include a mandrel of a predetermined diameter. A cylindrical tube of stock material, for example cardboard or plastic, is positioned on the mandrel. A cutter assembly then engages the cylindrical tube to cut cores of the tubular stock material to predetermined widths.

In prior art core cutting machines, it is often necessary to shut the machine down and modify or substitute the mandrel if tubular stock material of a different diameter is to be utilized.

A primary object of the present invention is to provide an improved core cutting machine which includes a plurality of mandrels of differing diameters. The mandrels receive tubes of core stock materials of differing diameters. The core cutting machine, according to the present invention, provides an efficient method of cutting cores without the necessity of modifying or replacing mandrels.

SUMMARY OF THE INVENTION

The present invention is directed to a core cutting machine having a base and a plurality of mandrels horizontally mounted above the base. The plurality of mandrels are of differing diameters and include outer peripheries for receiving tubular stock to be cut.

A cutter assembly is mounted adjacent each of the mandrels for cutting cores from the tubular stock positioned on the mandrels. A support assembly is adjustably mounted adjacent each of the mandrels in opposed relationship to the cutter assembly for supporting the core during cutting.

DETAILED DESCRIPTION OF THE PREFERRED EMBODIMENT

Figure 1:
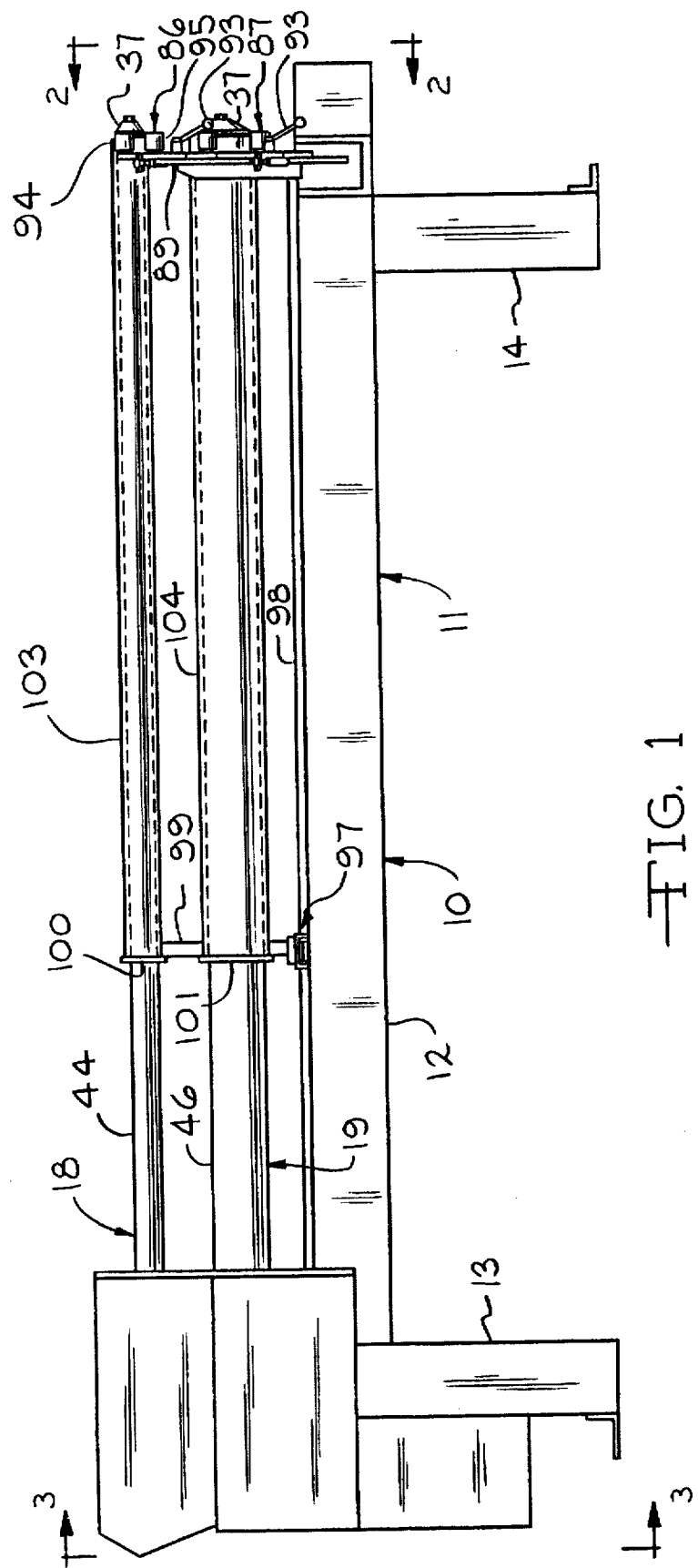
FIG. 1 is an elevational view of a core cutting machine, according to the present invention.
Figure 3:
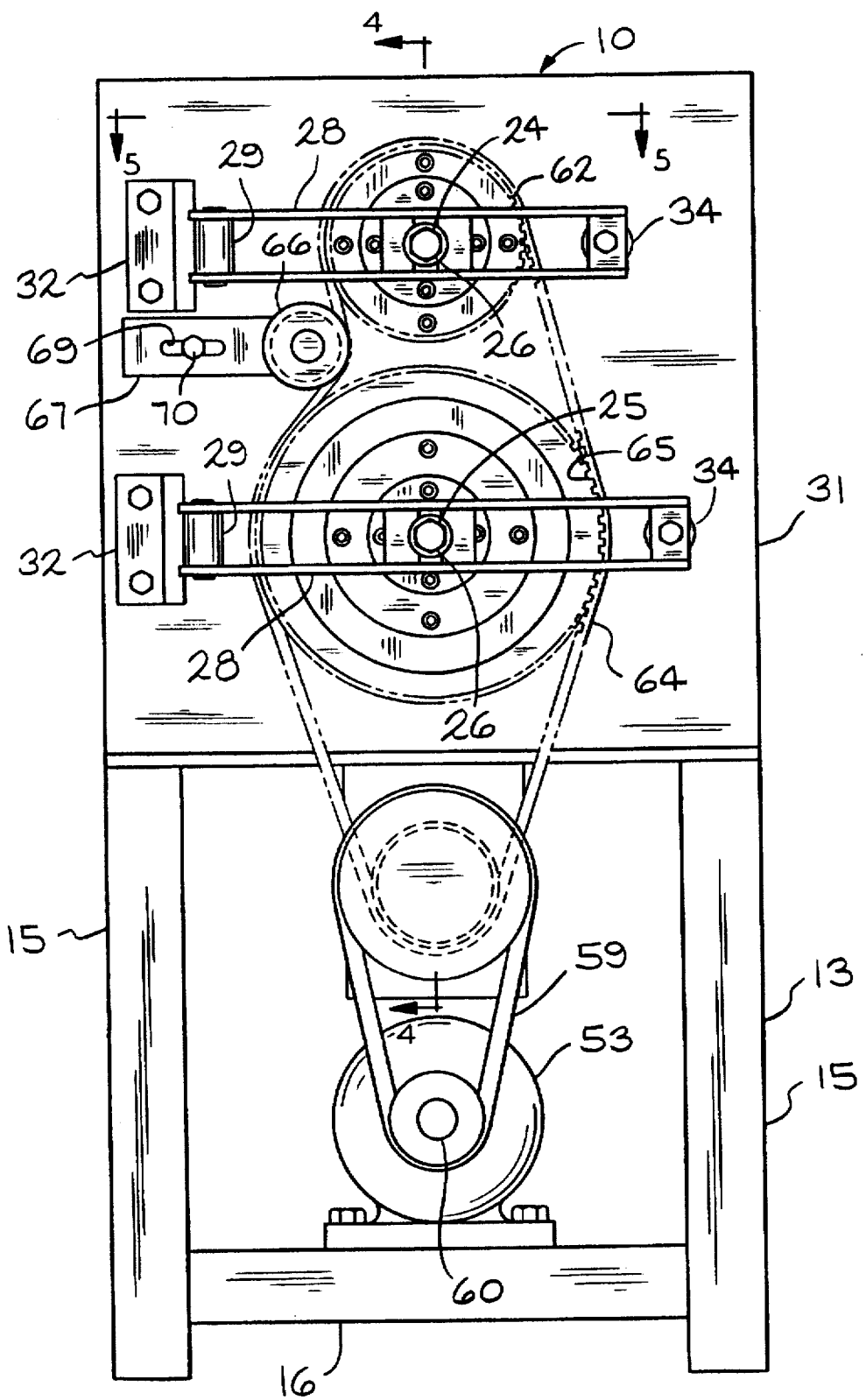
FIG. 3 is an end view taken along the line 3—3 of FIG. 1, shown on an enlarged scale.

A core cutting machine according to the present invention is general indicated by the reference number 10 in FIG. 1. The core cutting machine 10 includes a base 11. In the present embodiment, the base 11 includes a horizontally extending table 12, a rear support 13 and a front leg 14. Referring to FIG. 3, the rear support 13 includes a pair of vertical members 15 and a bottom support 16 mounted between the vertical members 15.

Figure 4:
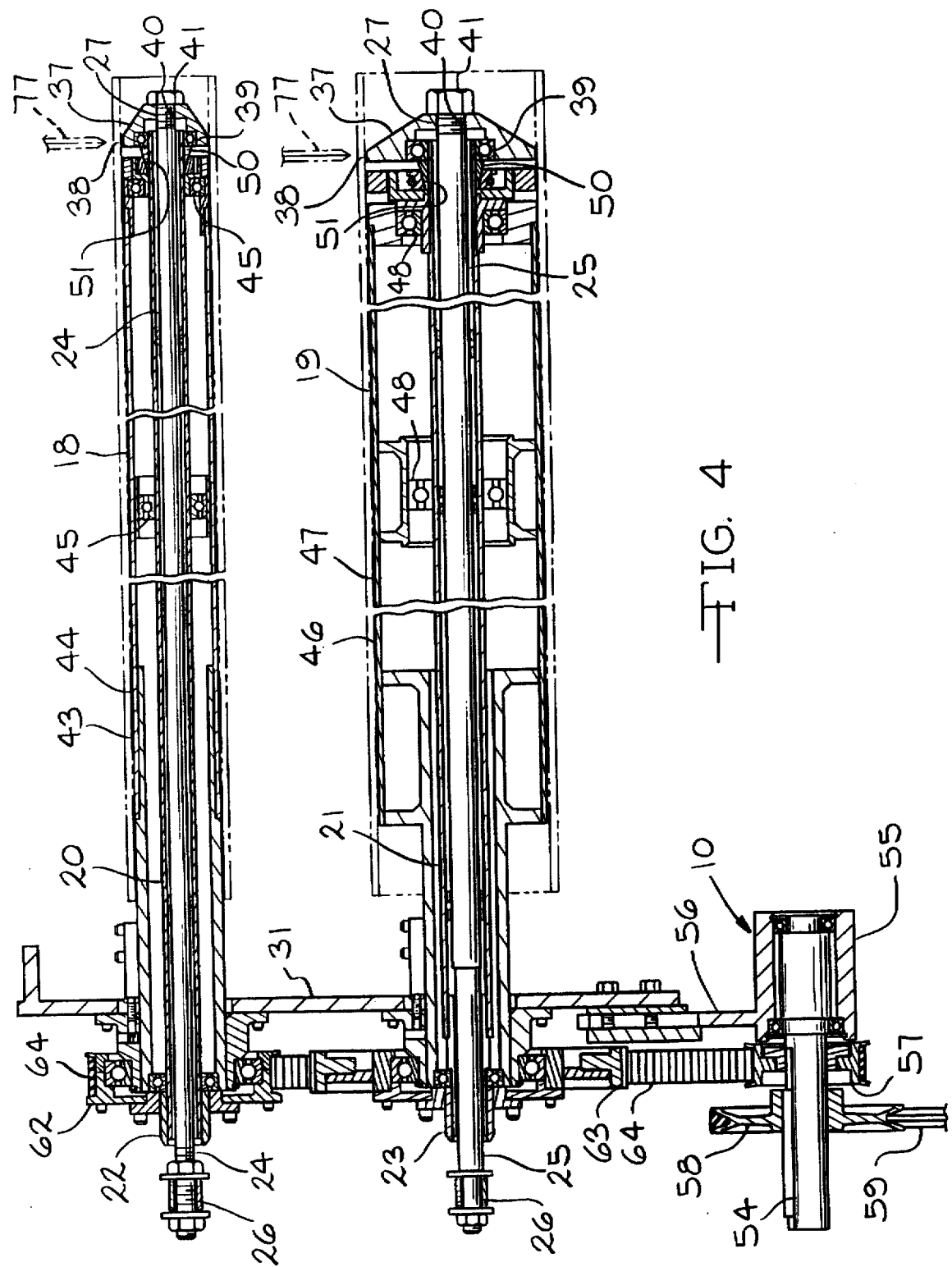
FIG. 4 is a sectional view taken along the line 4—4 of FIG. 3 and indicating by dashed lines the position of stock material tubes on the mandrels and also indicating the cutting knives in a position ninety degrees out of their true axial position.

A plurality of mandrels are horizontally mounted above the base 11. In the present embodiment, there are two mandrels, an upper mandrel 18 and a lower mandrel 19. The upper mandrel 18 includes an inner drive tube 20 and the lower mandrel 19 includes an inner drive tube 21. Referring to FIG. 4, the inner drive tube 20 is mounted for rotation within a driven hub 22 and the inner drive tube 21 is mounted for rotation within a driven hub 23. A rod 24 extends through the inner drive tube 20 and a rod 25 extends through the inner drive tube 21.

Figure 5:
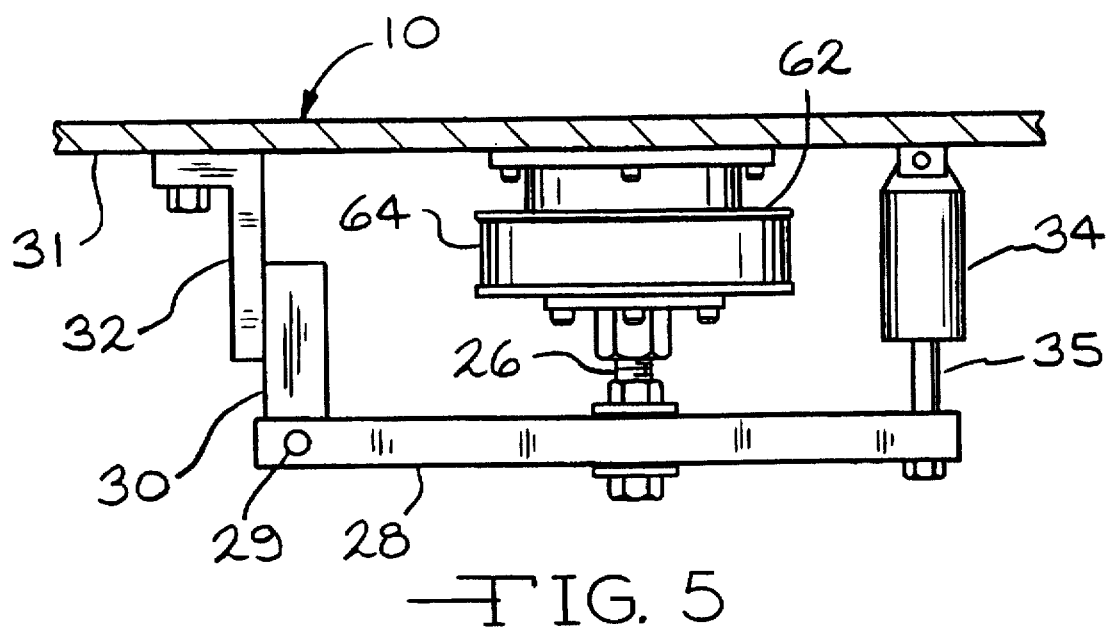
FIG. 5 is a fragmentary sectional view taken along the line 5—5 of FIG. 3.

Referring to FIGS. 3–5, the rods 24 and 25 include an operating end 26 and a distal end 27. An arm 28 is pivotally mounted by a pivot pin 29 to a support member 30. A back plate 31 (FIG. 3) extends upwardly from the vertical members 15 of rear support 13 and mounts brackets 32. The support members 30 are fixed to the brackets 32. The back plate 31 also pivotally mounts cylinders 34 having rods 35 which are connected to the arms 28 in an opposed relationship to the pivot pins 29. When the cylinders 34 are actuated, the rods 24 and 25 are reciprocated within the inner drive tubes 20 and 21.

Conical support members 37 having a cylindrical outer surface 38 are mounted by circular bearings 39 on the distal ends 27 of the inner drive tubes 20 and 21. Each of the conical support members 37 includes a center opening 40 which surrounds the distal ends 27 of the rods 24 and 25. Nuts 41 are threaded on the distal ends 27 adjacent the conical support members 37.

Referring to FIG. 4, an outer driven tube 43 having an outer periphery 44 is mounted by circular bearings 45 located between the inner drive tube 20 and the outer driven tube 43. The outer driven tube 43 surrounds the inner drive tube 20. Similarly, an outer driven tube 46 having an outer periphery 47 surrounds the inner drive tube 21. The outer driven tube 46 is rotatably mounted by circular or ring bearings 48. When the cylinders 34 are in their retracted positions and the inner drive tubes 20 and 21 are rotating, the outer driven tubes 43 and 46 are not connected in a drive relationship and remain stationary. However, when the cylinders 34 are actuated and the cylinder rods 35 extended, the arms 28 pivot outwardly and the rods 24 and 25 are moved to the left as shown in FIG. 4. The conical support members 37 mounted on the distal ends 27 are also moved to the left. A circular wedge ring 50 is mounted on the inner drive tubes 20 and 21 and is forced to the left into engagement with a drive surface 51 which is operatively connected to the outer driven tubes 43 and 46. This provides a direct drive connection between the inner drive tubes 20 and 21 and the respective outer driven tubes 43 and 46.

Referring to FIG. 3, a drive motor 53 is mounted on the bottom support 16 of the base 11. A spline shaft 54 is journaled in a shaft housing 55 which depends from a leg 56 mounted on the back plate 31. The spline shaft 54 mounts a sprocket 57 and a pulley 58. A drive belt 59 extends between an output shaft 60 of the motor 53 and the pulley 58. An upper toothed sprocket 62 surrounds the hub 22 and is operatively connected to the inner drive tube 20. Similarly, a toothed sprocket 63 surrounds the hub 23 and is operatively connected to the inner drive tube 21. A timing belt 64 having interior notches 65 is mounted in a mating relationship with the sprocket 57, the upper toothed sprocket 62 and the lower toothed sprocket 63. When the motor 53 is actuated, the pulley 58 rotates the spline shaft 54 and the sprockets 57, 62 and 63 to rotate the inner drive tube 20 and the inner drive tube 21. Referring to FIG. 3, a tensioning roller 66 is mounted by a bracket 67 adjacent the timing belt 64. The bracket includes a longitudinally extending slot 69.

A bolt 70 extends through the slot 69 to adjustably mount the bracket 67 to the back plate 31. To adjust the tension of the timing belt 64, the bolt 69 is loosened and the bracket 67 moved to move the tensioning roller 66 toward or away from the timing belt 64.

Figure 2:
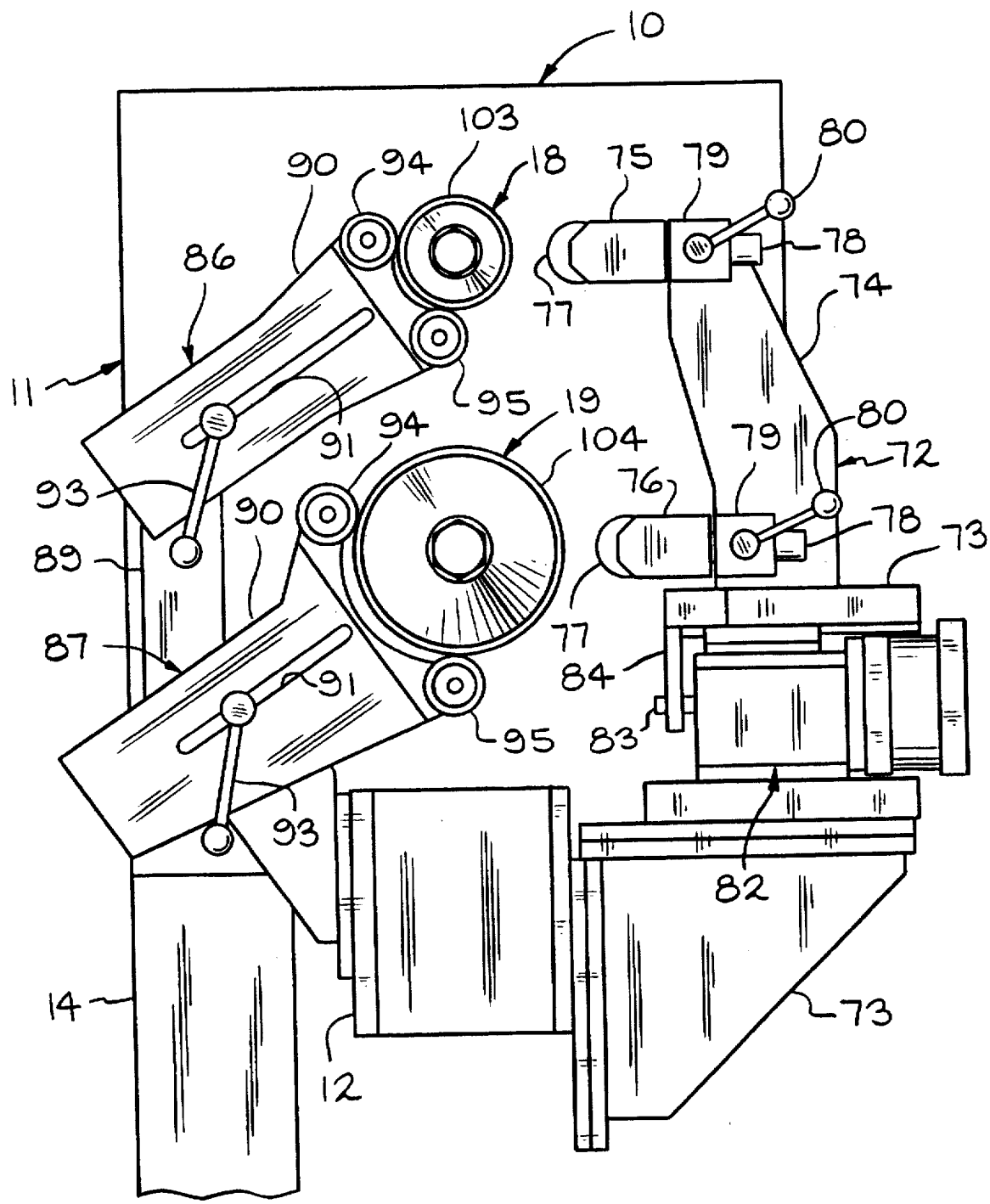
FIG. 2 is a fragmentary end view taken along the line 2—2 of FIG. 1, shown on an enlarged scale.

Referring to FIG. 2, a cutter assembly 72 is mounted on a support member 73 which is connected to the table 12 of the base 11. The cutter assembly 72 includes a movable platform 73, an upwardly extending arm 74 and a pair of spaced knife assemblies 75 and 76. The knife assemblies 75 and 76 include circular rotatably knives 77 mounted on their outer ends. The knife assemblies 75 and 76 include supports 78 which extend rearwardly and are received by holders 79 mounted on the arm 74. Handle assemblies 80 releasably secure the supports 78 to the holders 79. For fine adjustment of the circular knives 77, the handle assemblies 80 are rotated and the supports 78 moved relative to the holders 79 to make the fine adjustments. A cylinder 82 having a rod 83 is connected to the movable platform 73 by a support member 84. Actuation of the cylinder 82 and its rod 83 provides the primary adjustments of the circular knives 77 of the knife assemblies 75 and 76 toward and away from the upper mandrel 18 and the lower mandrel 19.

Referring to FIG. 2, an upper support roller assembly 86 is mounted adjacent the upper mandrel 18 and a lower support roller assembly 87 is mounted adjacent the lower mandrel 19. A support leg 89 is mounted on the table 12. The support roller assembly 86 and the support roller assembly 87 include roller plates 90 defining longitudinally extending slots 91 therethrough. Adjustable handle assemblies 93 releasably secure the roller plates 90 to the support leg 89. Each of the support roller assemblies 86 and 87 includes spaced rollers 94 and 95 mounted on the outer ends of the roller plates 90. Each pair of spaced rollers 94 and 95 are positioned adjacent a respective one of the mandrels 18 and 19. To adjust the position of the pair of spaced rollers 94 and 95, the adjustable handle 93 is loosened and the roller plate 90 moved forwardly or backwardly until the spaced rollers 94 and 95 are in their desired position.

When the knife assemblies 75 and 76 and their circular knife 77 are positioned in cutting position adjacent the mandrels 18 and 19, the support roller assemblies 86 and 87 provide the counteractive forces to resist deflection of the mandrels 18 and 19 during the cutting operation.

Referring to FIG. 1, the core cutting machine 10 includes a core tube pusher assembly 97 which is mounted for movement along the table 12. The core tube pusher assembly 97 includes a continuous driven drive belt 98 and an upwardly extending stand 99 which mounts in upper ring 100 and lower ring 101. The ring 100 surrounds the upper mandrel 18 and the ring 101 surrounds the lower mandrel 19. When a upper core tube 103 is positioned adjacent the outer periphery 44 of the outer driven tube 43 and a core tube 104 is positioned in surrounding relationship to the outer periphery 47 of the outer driven tube 46, the drive belt 98 is energized for a predetermined movement and the rings 100 and 101 of the core tube pusher assembly 97 moves the core tubes 103 and 104 a predetermined distance. This occurs each time a knife cut is made so that a subsequent cut may be readied. The core tubes 103 and 104 are normally constructed of cardboard, from a plastic material or from a laminated material. The core tubes are cut to individual predetermined widths. In the present embodiment, the upper core tube 103 has a three inch diameter and the lower core tube 104 has a six inch diameter. The core tube length in the present embodiment is 120 inches. The present core cutting machine 10 is able to effectively cut a core tube wall up to a one inch thickness.

In a typical operation of a core cutting machine 10, according to the present invention, the core tube pusher assembly 97 is moved to the left, as shown in FIG. 1, at the start of an operation. A new core tube 103 is placed on the upper mandrel 18 and a new core tube 104 is placed on the lower mandrel 19. In some situations, only one core tube is placed on one of the mandrels. In other core cutting machines, according to the present invention, additional mandrels are included on the core cutting machine and operate in the same manner as described.

The cylinders 34 are retracted and the rods 24 and 25 are at their far right position, as shown in FIG. 4. The drive motor 53 is actuated and the timing belt 64 rotates the inner drive tubes 20 and 21. At this time, the outer driven tubes 43 and 46 remain stationary along with the rods 24 and 25.

The cylinders 34 are then actuated and the arms 28 pivoted outwardly moving the rods 24 and 25 to the left (as shown in FIG. 4). This moves the distal ends 27 of the rods 24 and 25 to the left along with the conical support members 37. The adjacent circular wedge members 50 are also urged to the left. The drive surfaces 51 are engaged operationally connecting the inner drive tubes 20 and 21 to the outer driven tubes 43 and 46. The wedge members 50 and the drive surfaces 51 act as connectors between the inner drive tubes 20 and 21 and the outer driven tubes 43 and 46. The core tubes 103 and 104 which are positioned on the outer peripheries 44 and 47 of the outer driven tubes 43 and 46 begin to rotate.

Referring to FIG. 2, the support roller assemblies 86 have their spaced rollers 94 and 95 adjacent the mandrels 18 and 19. The cylinder 82 is actuated and the knives 77 moved against the core tubes 103 and 104 to cut cores of desired widths. After cutting is completed the cylinder 82 is retracted and the drive belt 98 of the core tube pusher assembly 97 is energized to move the core tubes 103 and 104 a predetermined distance. The above sequence is repeated until the end of the respective core tubes 103 and 104 are reached. New core tubes are placed on the upper and lower mandrels 18 and 19 and the operation repeated.

The mandrels 18 and 19 can be of many different diameters. In addition, while in the present situation the core tubes 103 and 104 are rotated, it is also possible as an alternative to rotate the circular knives 77 of the knife assemblies 75 and 76 to provide relative cutting rotation with the core tubes 103 and 104.

Many other revisions may be made to the above described embodiment without departing from the scope of the invention or from the following claims.

I claim:

1. A core cutter machine comprising a base, a plurality of mandrels horizontally mounted above said base, each of said mandrels having a different cutter diameter for receiving core tubes of different inside diameters, each of said mandrels including an outer periphery for receiving a core tube to be cut, each of said mandrels including an inner drive tube and an outer driven tube surrounding said inner drive tube, a connector between said outer driven tube and said inner drive tube, said connector comprising a drive member positioned between said inner drive tube and said outer driven tube, a cutter assembly mounted adjacent each of said mandrels for cutting a core tube positioned on said mandrel, a support assembly adjacent each of said mandrels in opposed relationship to said cutter assembly for supporting said core tube during cutting and motor means operatively connected to said inner drive tube.

2. A core cutter machine, according to claim 1, wherein said outer driven tube includes a drive surface and said drive member comprises a movable wedge member positioned between said inner drive tube and said outer driven tube and said drive surface.

3. A core cutter machine comprising a base, a plurality of mandrels horizontally mounted above said base, each of said mandrels having a different outer diameter for receiving core tubes of different inside diameters, each of said mandrels including an outer periphery for receiving a core tube to be cut, a cutter assembly mounted adjacent each of said mandrels for cutting a core tube positioned on said mandrel, a support assembly adjacent each of said mandrels in opposed relationship to said cutter assembly for supporting said core tube during cutting each of said mandrels including an inner drive tube and an outer driven tube surrounding said inner drive tube, a connector between said outer driven tube and said inner drive tube and motor means operatively connected to said inner drive tube, said outer driven tube including a drive surface and said connector comprising a movable wedge member positioned between said inner drive tube and said outer driven tube and said drive surface.

\* \* \* \* \*